United States Patent
Czimny et al.

[11] Patent Number: 5,316,351
[45] Date of Patent: May 31, 1994

[54] HOSE SWIVEL

[75] Inventors: Arnold Czimny; Spencer M. Nimberger, both of Harris County; Robert L. Ward, Fort Bend County, all of Tex.

[73] Assignee: Precision General, Inc., Houston, Tex.

[21] Appl. No.: 926,689

[22] Filed: Aug. 6, 1992

[51] Int. Cl.⁵ .................. F16L 33/16; F16L 27/00
[52] U.S. Cl. ........................ 285/276; 285/98; 285/99; 285/350; 277/95; 277/136; 277/206 R
[58] Field of Search .............. 285/98, 99, 276, 281, 285/350, 352; 277/206 R, 95, 96, 136

[56] References Cited
U.S. PATENT DOCUMENTS

| 913,144 | 2/1909 | James et al. | 285/99 |
| 2,289,164 | 7/1942 | Arnold et al. | 285/350 |
| 2,789,847 | 4/1957 | Jackson | 285/276 |
| 4,626,003 | 12/1986 | Williams et al. | 285/276 |
| 5,087,504 | 2/1992 | Kanai et al. | 285/350 |

FOREIGN PATENT DOCUMENTS 1258305 12/1971 United Kingdom .................. 285/99

Primary Examiner—Paula A. Bradley
Assistant Examiner—Jeffrey T. Knapp
Attorney, Agent, or Firm—Browning, Bushman, Anderson & Brookhart

[57] ABSTRACT

A swivel for transmitting fluid be sing and female housing includes a bearing assembly and seal ring assembly. The seal ring assembly comprises a pair of seal rings each including a plastic ring having a generally U-shaped cross-sectional configuration defining a stop leg for static sealing engagement with a stop surface of one housing and an opposing dynamic leg. Each seal ring member also includes an elastomeric ring which is fitted within the cavity for urging the dynamic leg axial away from the stop leg, and for maintaining a static seal with a static sealing surface on the respective housing. The swivel of the present invention is particular well suited for use between a hose and a fill valve of a propane or LPG gas tank. The swivel of the present invention is able to withstand jarring and shock, and has surprisingly long life and low maintenance.

24 Claims, 3 Drawing Sheets

HOSE SWIVEL

FIELD OF THE INVENTION

The present invention relates to swivels of the type which allow rotation between an upstream and a downstream swivel component while maintaining a fluid tight connection therebetween. More particularly, the present invention relates to a hose swivel for connecting a hose to a discharge nozzle or fill valve, and has particular utility for use in propane, LPG, and anhydrous ammonia applications.

BACKGROUND OF THE INVENTION

Swivels have long been provided in fluid lines to allow rotation of one line component with respect to another line component. While some prior art swivels allow only limited angular rotation of these components, many swivels allow rotation about 360 degrees, and allow numerous repeated rotations. In many applications, a conventional O-ring seal within the swivel maintains a desired fluid tight seal between the upstream and downstream swivel components in a cost effective and reliable manner. In other applications, reliable sealing between swivel components cannot be maintained over an extended period of time. In some instances, the fluid being transmitted through the swivel deteriorates the swivel seal, while in other applications the swivel is subjected to jarring, bumping, or shock from any number of sources which damage the seal or sealing surface, and/or otherwise cause pressurized fluid to leak past the seal.

One application which has long presented a problem with obtaining a reliable and cost effective seal concerns the transportation of certain petroleum products or other fluids, such as anhydrous ammonia, which are deleterious to conventional elastomeric seals. In many instances, a flexible hose is used to interconnect a supply tank with a storage tank or other vessel to be filled, and a discharge valve is accordingly provided at the free end of the hose. Those familiar with hoses recognize that hose twisting is inevitably required to position the discharge nozzle at the inlet of the tank or other vessel prior to filling, and a swivel is thus preferably used upstream of the discharge valve to reduce "fighting" the hose to this desired position. Some hoses are manufactured from materials and/or with wall thicknesses that result in a stiff hose, thereby requiring more effort or fighting to desirably position the end of the hose. Hose fighting is also increased when fluid pressure in the hose increases. Rotation of a component at the end of a hose occurs as the hose is reeled about or unwound from a hose reel, and this rotation substantially increases the hose fighting required to position the discharge end of a hose at a fill site. When the hose is rewound onto the reel, this rotation causes the fill valve or other component at the end of the hose to rotate, which increases the likelihood of shock or damage to the component.

Even though liquid hydrocarbons are passed through a swivel, in some applications, such as hydraulic applications or gasoline filling operations, this swivel may use conventional O-ring technology to maintain a reliable seal due to the characteristics of the fluid and the relatively low fluid pressure passing through the swivel. Those familiar with gasoline service stations from decades past may remember the difficulty associated with filling a car with gas utilizing a hose which does not contain a swivel, and the relative ease of performing the same operation with today's gas pump hose having a swivel both at the stationery pump/hose connection, and most importantly at the hose/gas discharge valve connection.

The type of swivel successfully used at gasoline service stations unfortunately cannot be reliably used in other applications. When filling a liquified petroleum gas (LPG) or propane tank at a house or business, the operator of the delivery truck or bobtail typically utilizes a hose 20 meters long or more to connect the portable fill tank with the stationery tank to be refilled. While a gasoline-type swivel has been tried between the free end of the hose and the fill valve, such a swivel has a very short life since the seal soon starts to leak, primarily due to the fluid "drying out" the O-ring seal. Due to the high unreliability of these conventional swivels, many companies and/or operators use no swivels on their equipment to justifiably minimize safety and environmental concerns. While many individuals have some experience with "fighting" a gasoline fill hose, few people other than bobtail operators appreciate the extreme effort associated with fighting a 30 meter long LPG hose during freezing outdoor temperatures in order to properly position the fill valve at the inlet of a homeowner's heating tank.

A product referred to as the Full Circle swivel was recently introduced to the market to provide a more reliable connection between a liquified gas hose and a fill valve. This swivel relies on a mechanical seal of the type commonly employed in pumps to seal between the upstream and downstream swivel components. Two dynamic sealing faces must thus be maintained, with the mechanical seal rotating at one half the speed of one swivel component relative to the other swivel component. While this swivel does alleviate hose fighting and simplifies the fill valve to fill tank connection, the swivel has a number of other disadvantages. The swivel is costly since the mechanical seal must reliably seal with two different high-tolerance sealing faces. Due to the nature of this swivel connection, extreme care must be taken to avoid jarring or shock to the swivel, although those familiar with bobtail filling operations recognize that the free end of the filling hose often is dragged along the ground when the hose is rewound after the filling operation. The torque required to cause rotation between the swivel components of this product also varies as a function of the fluid pressure through the swivel, since increased sealing force is generated by increased fluid pressure. Since LPG filling pressure may vary from less than 100 PSI to over 300 PSI, the swivel may serve its desired purpose under low fluid pressure conditions, but substantially increased torque is required to cause rotation of the swivel under higher fluid pressure conditions. In addition to being expensive to manufacture and maintain, leakage of the Full Circle swivel cannot be checked with conventional soap bubble-type leak detector liquids since these solutions damage the mechanical seal of the swivel.

These and further disadvantages of the prior art are overcome by the present invention, and an improved swivel is discussed in detail below. The swivel of the present invention has particular utility with respect to connections to hoses used for transmitting fluids which are otherwise deleterious to conventional O-ring seals, such a propane, LPG, or anhydrous ammonia.

SUMMARY OF THE INVENTION

The swivel according to the present invention may be used in various applications, but is particularly described herein for use between a flexible hose connected at one end to a truck or other distribution vessel and at its other end to a discharge or fill valve. The stored hose is wound about a reel, so that hose fighting is a significant problem if a swivel is not provided. In an exemplary application, propane is passed through the hose, through the swivel, and then through the valve to fill a fuel storage tank at a residence, which may be located 30 meters or more from the nearest location accessible to the distribution truck. The swivel serves the purpose of allowing the fill valve to freely rotate relative to the hose, thereby substantially reducing the effort required by the operator to properly position the fill valve at the inlet of the fuel storage tank.

The swivel of the present invention includes a male housing, a female housing, a bearing assembly acting between the housings to permit rotation about a central axis, and a seal assembly acting between a male and female housing. The seal assembly, in turn, comprises first and second annular seal rings each substantially forming a static seal with the male and female housing, respectively, with axially interior faces of the seal rings forming the dynamic seal which permits rotation of one housing relative to the other without loss of fluid. In an exemplary embodiment, each seal ring comprises a generally U-shaped plastic body orientated to position its opening away from the central axis of the swivel. The plastic body has an axially outer ring-shaped leg secured to the respective housing, and an opposing axially inner-ring-shaped leg forming the planar surface for dynamic sealing engagement with the opposing seal ring. A ring-shaped base on each seal ring interconnects the axially outer and the axially inner leg, and is positioned toward the axis of the swivel. A sealing face on the inner leg of the pair of seal rings together form a dynamic sealing interface which is preferably perpendicular to the central axis of the swivel. The cavity between the axially outer and axially inner legs of each sealing ring contain an elastomeric ring, such as a Viton O-ring, which both exerts an axial force to bias the inner leg axially from the outer leg, and maintains a reliable static seal with the respective housing. Each seal ring may be positioned within a groove provided in the respective housing.

It is an object of the present invention to provide an improved fluid swivel for reliably transmitting fluid between line components, such as a flexible hose and a fill valve, while permitting rotation of one component relative to the other component. The swivel of the present invention includes a sealing assembly which comprises a pair of seal rings each forming a static seal with one of the swivel housings, and together forming a dynamic seal to prevent escape of fluid. It is another object of the invention to provide an improved dynamic seal that has utility in various applications. An improved method of forming a dynamic seal for use in a swivel or other device with a rotatable component is also disclosed.

It is a feature of this invention that fluid pressure within the swivel may enhance static sealing reliability between each sealing ring in its respective housing, but that fluid pressure causes no significant effect on the torque required to rotate one seal ring relative to the other seal ring. Accordingly, rotational freedom between the male and female swivel housings is not substantially dependent upon the pressure transmitted through the swivel. The dynamic sealing surfaces of the sealing rings are in plastic-to-plastic engagement, thereby minimizing costs and substantially enhancing sealing life.

It is an advantage of the present invention that the swivel is not highly sensitive to jarring and/or shock, and thus may be reliably used in numerous applications.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
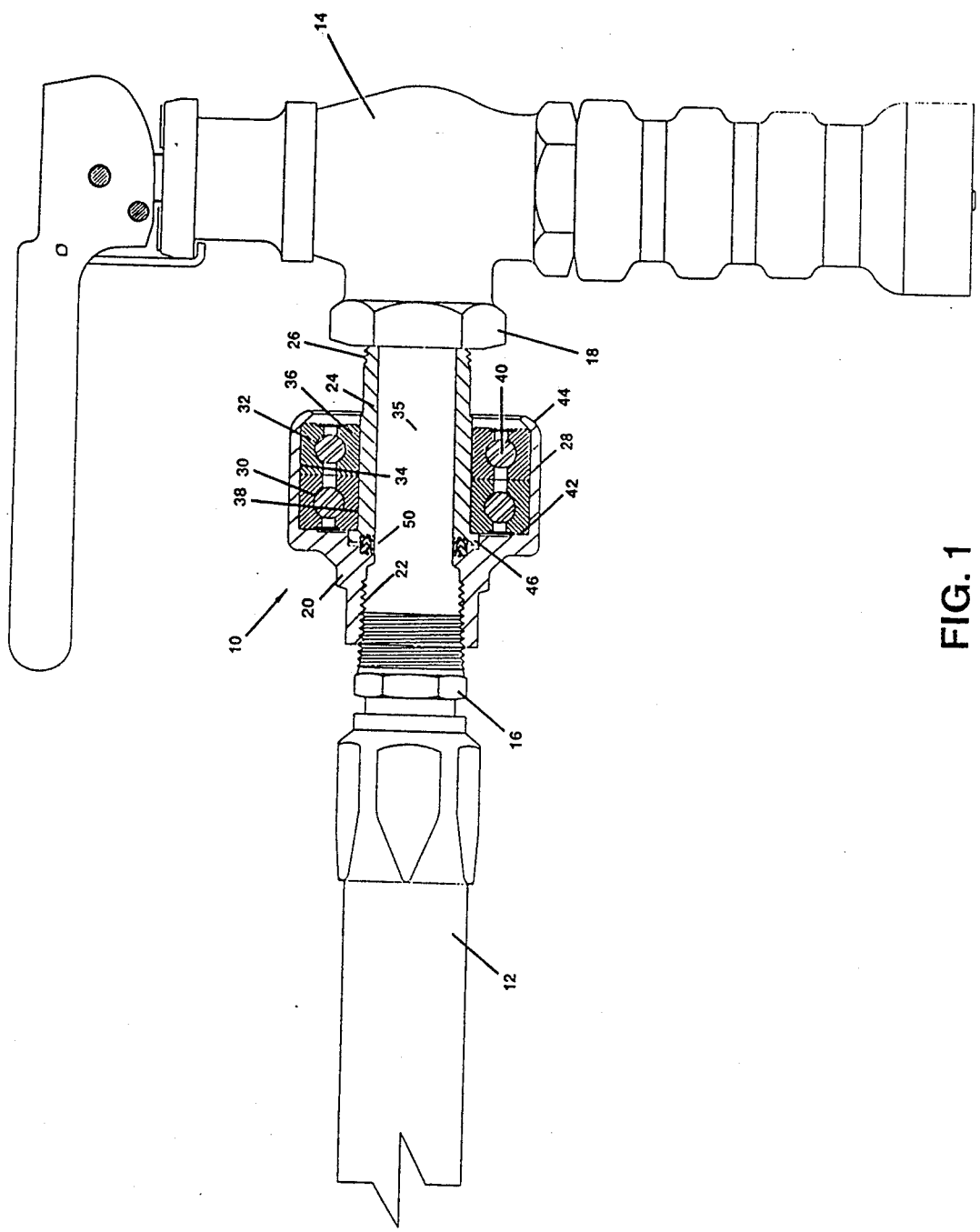
FIG. 1 is a pictorial view one embodiment of a swivel according to the present invention, shown in cross-section and interconnecting a hose and a propane fill valve.

FIG. I generally depicts one embodiment of a swivel 10 according to the present invention. In an exemplary application, the swivel interconnects the free end of a flexible hose 12 and a fill valve 14, each including a conventional connector 16, 18 respectively, for threaded engagement with the swivel. Although not shown in FIG. 1, it should be understood that the hose 12 may extend 30 meters or more to a bobtail or other storage vessel, and that fill valve 14 is that the type conventionally used to fill a fuel storage tank at a residence or business location. The swivel 10 is particularly well suited for the application depicted in FIG. 1, and as described below it is assumed that propane or LPG is being transmitted through the flexible line and the fill valve, and thus through the swivel 10, under an exemplary pressure of from 100 PSI to 300 PSI.

The swivel 10 comprises a female housing 20 having internal threads 22 for engagement with fitting 16, a male housing 24 having external threads 26 for engagement with fitting 18. The male housing 24 is generally sleeve-shaped, while the female housing 20 includes enlarged collar portion 28 sized to receive both the male housing and bearing assembly 30 acting between these housings. Bearing assembly 30 includes an outer race 32 for substantially static engagement with cylindrical inner surface 34 of portion 28, inner race 36 for similar engagement with cylindrical outer surface 38 of male housing 24, and a plurality of ball bearings or other conventional bearing members 40 for allowing ease of rotation between the races 32 and 36, and thus relative rotation of one housing with respect to the other housing about central axis 35.

The swivel 10 shown in FIG. 1 is not configured for ease of repair, since test results have shown that the bearing and sealing components have an extremely long life. The bearing assembly 30 is accordingly fixed within the female housing 20 and between the stop surface 42 thereon and the crimped over end 44 of collar portion 28. Sealing assembly 50 is trapped or sandwiched between the male and female housings as depicted in FIG. 1. A ring-shaped ledge 46 of the male housing 24 engages the bearing assembly 30, which cooperates with stop surface 42 to effectively fix the axial spacing between the assembled male and female swivel housings.

Figure 2:
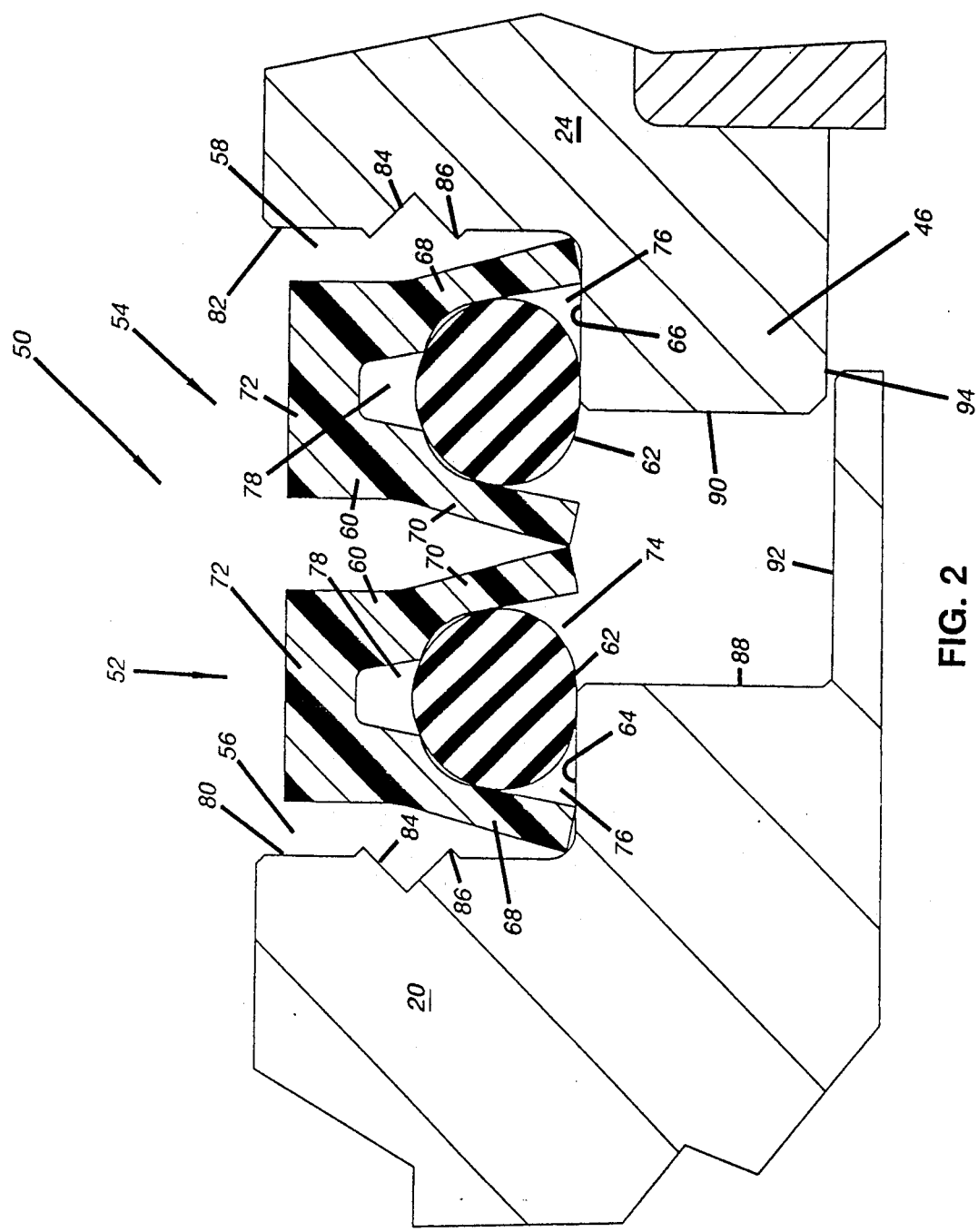
FIG. 2 is a detailed cross-sectional view of the seal assembly generally shown in FIG. 1 before final assembly of the swivel housings.

FIG. 2 depicts sealing assembly 50 prior to final assembly of the female housing 20 and the male housing 24, i.e., before the crimping operation. The sealing assembly comprises first seal ring member 52 and a second substantially identical second seal ring member 54, each of which is fitted within a respective groove 56, 58 of the female and male housings prior to assembly. Each ring member comprises a plastic ring 60 having a generally Unshaped cross-sectional configuration, and an elastomeric ring 62 having a circular cross-sectional configuration. As manufactured, each seal ring member 60 has a configuration as shown in FIG. 2. The inner portion each elastomeric ring 62 has been slightly compressed as shown in FIG. 2, since the outer diameter of each ring 62 is slightly greater than the diameter of the respective static sealing surfaces 64 and 66 on the female housing 20 and the male housing 24, respectively. The slight compression of the ring 62 assists in retaining the rings in place within the grooves 56, 58 during the assembly operation.

The cross-sectional configuration of each plastic ring 60 defines an axially outward ring-shaped stop leg 68, and an opposing axially inner ring-shaped dynamic leg 70, with base 72 interconnecting these legs. A cavity 74 between the respective legs opens away from the central axis 35 of the swivel, and includes a general Unshaped cross-sectional portion 76 for receiving the elastomeric ring 62 and an adjoined portion 78 for receiving excess elastomeric material, as described subsequently. When the swivel is assembled, each stop leg 68 is in engagement with stop surface 80, 82 on the female and male housings, respectively. After assembly, rotation between each seal ring member 52, 54 and each seal ring respective housing is not desired, and a punch may be used to form a plurality of indentations 84 circumferentially spaced about the surfaces 80, 82, which create slight projections 86 to engage each respective leg 68 and prohibit this rotation. In FIG. 2, note that prior to complete assembly and upon first engagement of the inner legs 70 of the seal ring member 52, 54, surface 88 on the female housing 20 is spaced substantially from opposing surface 90 on the male housing. During assembly and during operation of the swivel, the radial spacing between the housings is controlled by the bearing assembly 30. Accordingly, a slight gap may be maintained between the inner surface 92 on the female housing 20 and the outer surface 94 on the male housing 24.

Figure 3:
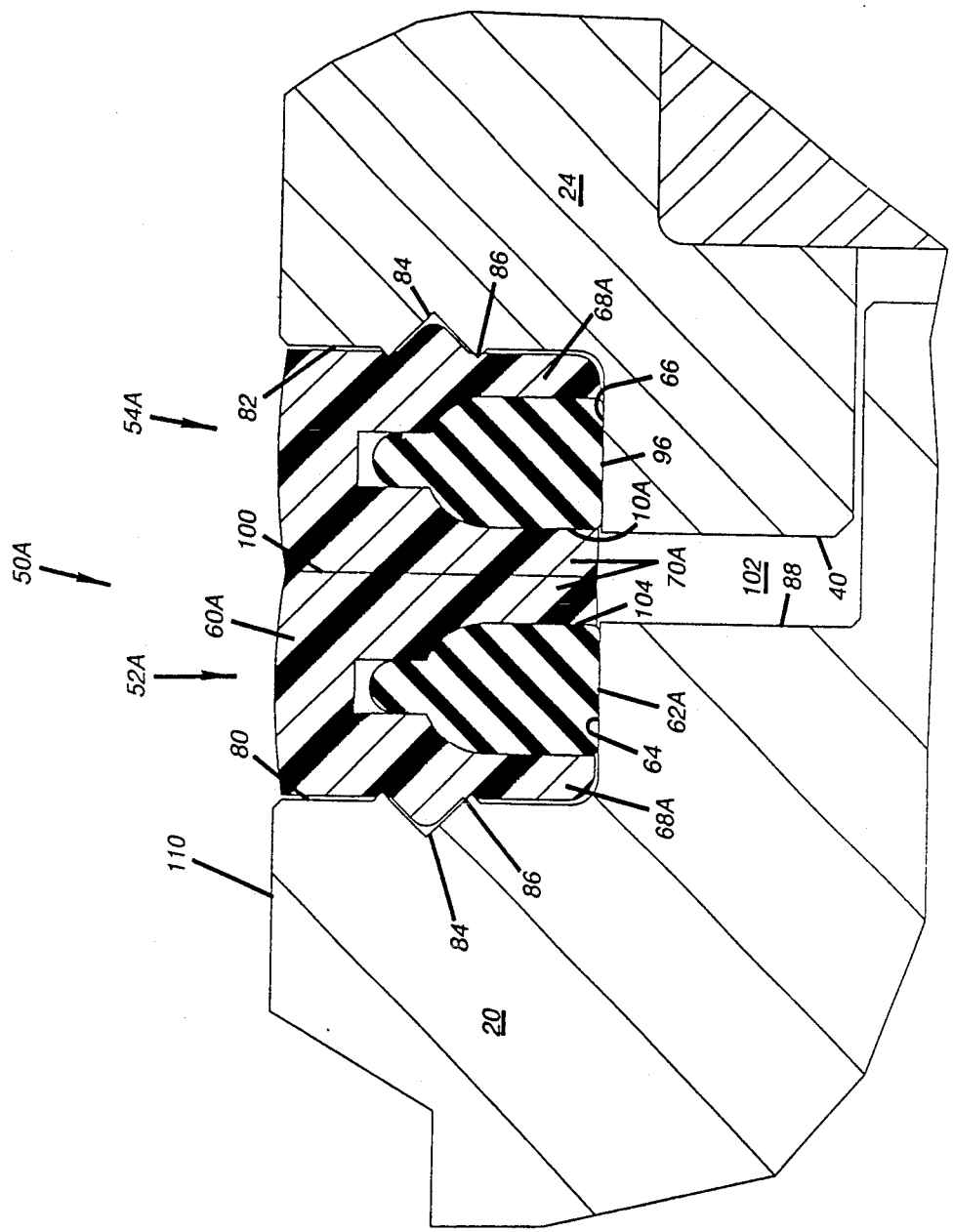
FIG. 3 is a detailed cross-sectional view of the seal assembly shown in FIG. 2 after final assembly of the swivel housings.

FIG. 3 depicts the assembly of FIG. 2 in its assembled condition, i.e., as shown in FIG. 1. During assembly, the bearing assembly 30 forces the male housing 24 axially toward the female housing 20, so that the gap between surfaces 88 and 90 is substantially reduced. This action also substantially eliminates the gaps between the stop leg 68A and each stop surface 80, 82, as well as the gap between the dynamic legs 70A, so that each secured ring member 52A and 54A achieves a generally rectangular cross-sectional configuration. This action substantially reduces the volume of portion 76 of cavity 74, thereby causing each elastomeric ring 62A to exert a higher axial force on the dynamic leg 70A away from its respective static leg 68A, and thus toward each other. Simultaneously, a reliable static seal is obtain between the substantially planar outer surface 96 of each elastomeric ring 62A and the respective sealing surfaces 64 and 66. Excess material from each elastomeric ring 62A may flow into restricted cavity 78 (compare FIGS. 2 and 3). It may now be seen that projections 86 fix the static legs to the female and male housings, respectively, and some material from each static leg 68A may enter the punched cavities 84 circumferentially spaced about the otherwise cylindrical surfaces 80, 82. Finally, the final assembly operation causes planar engagement of the opposing outer surfaces of the dynamic legs 70A thereby forming a dynamic planar seal 100 which preferably lies within a plane substantially perpendicular to the central axis 35.

Dimensions are preferably controlled such that the planar outer sealing surface 96 on each elastomeric ring 62A is substantially in full engagement with a sealing surface 64, 66 to prohibit elastomeric material from entering cavity 102 between surfaces 88 and 90. The surface 88 is thus preferably substantially spaced the same axial distance or axially closer to dynamic sealing surface 100 compared to the inner surface 104 on leg 70A. Similarly, surface 90 is the same axial distance or axially closer to sealing surface 100 compared to surface 108 when the swivel is assembled. The surfaces 88, 90 purposefully do not engage since rotation between these surfaces occurs during use of the swivel. It can also be seen in FIG. 3 that the sealing assembly 50A does not project radially inward from the cylindrical surface 110 which defines the flow path through the swivel, and according the sealing assembly does not restrict flow through the swivel.

Surprising long life has been obtained from the sealing assembly 50 of the present invention even when propane is being transmitted through the swivel. This long life is believed to be attributable to the fact that only a single dynamic seal is obtained, and that this dynamic seal is between two plastic materials. Tests have shown that this long seal life is not obtained, for example, if rotation is permissible between each seal ring and its respective metal housing. A mechanism other than a punch may be used to rotationally secure or fix each seal ring to its respective housing.

Since the seal rings 60 are manufactured from a low friction plastic material, the torque necessary to achieve rotation between the seal rings 60A is substantially independent of fluid pressure within the swivel, although the axially directed sealing force on the dynamic seal 100 may be substantially enhanced by increased pressure levels being transmitted through the swivel. The plane of seal 100 is perpendicular to the axis 35, and the axial sealing force at no pressure or low pressure is almost entirely dependent upon the axial spacing between surfaces 88 and 90, which may be easily regulated. It is believed that an axial force of from 100 to 350 pounds is sufficient to obtain the deformation of the seal rings as shown in FIG. 3, utilizing the materials discussed subsequently. At higher fluid pressure levels within the swivel, each ring member 52A, 54A acts in a piston-like manner to force the seal rings axially together and increase the sealing force on dynamic seal 100, as explained more fully below. Since the operation of the swivel nevertheless has substantially the same torque requirements for rotating one swivel component relative to the other regardless of fluid pressure, swivel reliability is increased, and any damage to swivel components may be more easily detected. Increased fluid pressure passing through the swivel also increases the static seal between each seal ring and its respective housing.

The male and female housings of the swivel according to the present invention may be fabricated from conventional metal goods, and any number of relatively low cost bearing assemblies may be used to control rotation of one housing relative to the other about a central axis. Plastic ring 60 may be fabricated from various materials which desirably provide substantially reduced friction when the dynamic sealing faces engage. It is also beneficial that the material for each plastic ring 60 be able to "cold flow" during deformation of the seal ring from its manufactured state as shown in FIG. 2 to its assembled state as shown in FIG. 3. Teflon is a particularly desirable material, although other plastic material, such as Delrin or ETFE, may be used. The material for the body of plastic ring 60 preferably does not substantially change its character in response to continued engagement with the fluid flowing through the swivel.

The elastomeric ring 62 positioned within the body preferably has a high "memory", so that it continually exerts an axial force on the dynamic leg as it tries to return to its original manufactured configuration. Although this elastomeric ring ideally has a circular cross-sectional configuration, other configurations could be used to achieve the purposes of the invention. Viton is a particularly suitable material for a swivel intended for anhydrous ammonia applications, since it is substantially insensitive to fluids conventionally added to anhydrous ammonia which are generally deleterious to most elastomers. Neoprene may be used as the elastomeric material for some applications.

Various other alterations to the embodiment discussed above may be suggested from the above discussion. It is preferable that each of the static sealing surfaces 64, 66 be spaced radially outward from the respective stop surface 80, 82, so that fluid from the swivel may pass by the stop surfaces to reach the seal ring members 62, thereby assisting in "energizing" the elastomeric rings to effect a reliable static seal with the surfaces 64 and 66. As shown in FIG. 3, a leak path is thus intentionally provided between the outer leg 68A and the stop surface to achieve this purpose. This leak path also serves a function to press the seal ring member 52A, 54A axially toward each other, so that each seal ring member acts as a piston in response to fluid pressure, thereby enhancing sealing engagement of the dynamic sealing surfaces. This enhanced dynamic sealing as a result of fluid pressure may occur at lower fluid pressures under conditions whereby the fluid in the leak path is sealed at the radially outer portion of each real ring by sealing action between an outer diameter of each elastomeric ring and the engaging interior surface of the respective dynamic leg. In this condition, fluid pressure in the leak path exerts an axial force on the plastic ring, so that an axial force on the dynamic leg is forcing the seal ring members together. Enhanced dynamic sealing at high fluid pressure levels within the swivel likely creates a minute gap between the elastomeric ring and the dynamic leg, so that fluid passes through the leak path and through this minute gap, and is sealed by the elastomeric ring and the engaging surface of either the base of the plastic ring or the interior surface of the static leg. In this condition, the seal ring member is nevertheless acting in a piston-like manner to enhance dynamic sealing, with an axial force being applied to the elastomeric ring and transmitted through the elastomeric ring to the static leg to force the seal ring members axially together. It should be understood that substantially no axial movement of the seal ring members toward each other occurs with increased fluid pressure through the swivel. Increased fluid pressure does, however, produce a significant axial force tending to press the seal rings axially tighter, thereby enhancing the sealing reliability of the dynamic seal 100 as fluid pressure increases.

It is also desirable that each of the stop surfaces 80, 82 be a planar surface substantially perpendicular to the central axis 35, and that each of the static sealing surfaces 64, 66 is a cylindrical surface substantially perpendicular to the respective stop surfaces. In an alternative embodiment, the sealing surface may be positioned radially outward of the stop surface, but not be perpendicular to the stop surface. The sealing surface may, for example, be within the plane of the stop surface, in which case the body of plastic ring 60 may have a generally Unshaped configuration, but the dynamic leg would extend radially outward substantially longer than the stop leg, since the elastomeric seal can seal with either a stop surface perpendicular to the central axis, and/or with a cylindrical stop surface. Stop surfaces 80, 82 are preferably each planar surfaces, and may include some form of securing member to prevent rotation of the body 60A with respect to the stop surface. While the raised discontinuities 86 resulting from punched indentations 84 are a suitable and inexpensive technique to achieve this purpose, other discontinuities or other conventional securing mechanisms could be used to prevent rotation of each plastic ring 60A with respect to its housing.

The swivel 10 disclosed above is not intended for ease of repair, since tests have indicated that the seal assemblies 50 and the bearings 30 have an extremely long life. While the portions 44 formed by a crimping operation are a low cost technique for fixing the bearing assembly within the female housing, other conventional mechanisms could be employed. Also, those skilled in the art will readily appreciate that various threaded mechanisms could be used to position a stop relative to the portion 28 of the female housing to fix the position of the bearing assembly, and that this threaded mechanism could then be replaced and the bearing assembly 30 removed so that the seal assembly 50 could be inspected and/or replaced.

The cavity 74 between each stop leg and dynamic leg of the plastic ring body 60 includes a seal ring receiving portion 76 for receiving the majority of each of the seal ring, and an excess material portion 78 having a restricted access by receiving excess seal ring material during the deformation of the seal ring. Plastic ring 62 has a radially outward sealing surface for sealing engagement with a respective static sealing surface which is radially opposite the excess seal ring material with respect to the majority of each seal ring. Since the cavity 78 is spaced opposite the opening of the cavity 74, the base 72 of the body of plastic ring 60 may act in a manner similar to a hinge to allow flexing of the legs 68, 70 toward and apart from each other. The cavity portion 78 is preferably a restricted access portion, so that excess material from the seal ring does not flow into cavity 78 unfil after substantially the entirety of cavity 76 is filled and a reliable static seal is made with the respective sealing surface 64, 66.

While it is cost-effective that the elastomeric ring 62 serve the functions of both providing the static seal with each housing and exerting an axial force on the dynamic leg, these functions could optionally be accomplished with two different members. An elastomer or spring steel ring member could be provided in the interior of cavity 74 for exerting the desired axial force, and a separate elastomeric ring could be provided at the opening of the cavity 74 for effecting the static seal. It may also be possible to eliminate the member exerting the axial force on the dynamic leg, particularly if the seal is subjected to high fluid pressures, and the seal ring 62 serve the purpose of only providing the static seal.

In a preferred embodiment, the rings 60 are both fabricated from plastic, and accordingly have been referred to herein as plastic rings. The term liplastic"is used herein in a broad manner to describe any materials exhibiting substantially thermoplastic characteristics. It is possible, however, that one of these rings may be fabricated from other than a plastic material, provided that its dynamic sealing surface is highly smooth. For example, one sealing ring member could comprise a ceramic ring having a generally U-shaped cross-sectional configuration, with an elastomeric ring positioned in its cavity creating a static seal with a cylindrical sealing surface of one housing. The outer sealing ring member may include a plastic ring and an elastomeric ring as described herein. If desired, the ceramic ring may be secured by an adhesive or other means to its respective stop surface, so that the smooth ceramic material dynamic sealing surface of this sealing ring member would be effectively fixed to its respective housing. As the plastic material of the other ring member wore slightly during dynamic sealing, the combination of the axial force of the elastomeric ring and fluid pressure causing a piston effect on this other seal ring member could still maintain a reliable dynamic seal. Although less desirable, it may be possible that both rings 60 be fabricated from a material other than plastic, with one ring being fixed to its housing and the other ring being a "floating" ring that provides dynamic sealing engagement as a result of the piston effect acting on this floating ring.

The seal assembly of the present invention may be used for dynamic sealing between components other than swivel housings. Other exemplary applications for the sealing assembly of this invention include sealing between a pump housing and a relatively low RPM pump shaft, and sealing between a valve operator housing and a valve stem.

According to the method of the invention, a fluid seal is formed between housings by forming first and second annular plastics rings as shown in FIG. 2, and positioning an elastomeric ring within the cavity between each stop leg and dynamic leg, thereby forming a pair of seal rings. The seal rings may then be positioned so that each stop leg is in engagement with the respective stop surface, and an axial force applied to move the seal rings together to deform the plastic rings while simultaneously deforming the elastomeric rings. The elastomeric rings exert an axial force to press the dynamic legs together, and form a static seal with the sealing surface on the respective housing. The stop legs may be secured to the respective housing as shown in FIG. 3, and a bearing assembly may be utilized to control rotation of one housing relative to the other about a central axis. Various other changes and modifications will become apparent from the forgoing discussion, and are considered within the scope of the present invention.

We claim:

1. A swivel for transmitting fluid between an upstream component and a downstream component while permitting rotation of one component relative to the other, the swivel comprising:

a male housing having a cylindrical outer surface, a first seal stop surface, and a first static sealing surface;

a female housing having a cylindrical inner surface, a second seal stop surface, and a second static sealing surface;

a bearing assembly acting between the cylindrical outer surface of the male housing and the cylindrical inner surface of the female housing to permit controlled rotation of one housing relative to the other about a central axis;

a first annular seal ring member including a first plastic ring having a generally U-shaped cross-sectional configuration defining first ring-shaped stop leg for static engagement with the first seal stop surface, an axially spaced first ring-shaped dynamic leg, and a first base interconnecting the first stop leg and first dynamic leg, the first stop leg and the first dynamic leg defining a first cavity therebetween having a first opening;

the first seal ring member further including a first elastomeric ring within the first cavity for urging the first dynamic leg axially away from the first stop leg, and for maintaining a static seal ring member including as second plastic ring having a generally U-shaped cross-sectional configuration defining a second ring-shaped stop leg for static engagement with the second seal stop surface, an axially spaced second ring-shaped dynamic leg, and a second base interconnecting the second stop leg and second dynamic leg, the second stop leg and second dynamic leg defining a second cavity therebetween having a second opening;

the second seal ring member further including a second elastomeric ring within the second cavity for urging the second dynamic leg axially away from the second stop leg, and for maintaining a static seal with the second static sealing surface; and each of the first dynamic leg and second dynamic leg having a sealing surface in dynamic sealing engagement with the sealing surface of the other dynamic leg when the male housing rotates relative to the female housing.

2. The swivel as defined in claim 1, further comprising:

the base of each plastic ring generally facing the central axis;

the opening of each of the first and second cavity being radially outward such that fluid pressure within the male and female housing enhances static sealing between each first and second annular seal ring member and the respective first and second static sealing surface.

3. The swivel as defined in claim 1, further comprising:

the sealing surface of each first and second dynamic leg being a planar surface substantially perpendicular to the central axis.

4. The swivel as defined in claim 1, further comprising:

the female housing including a bearing stop surface for limiting axial movement of the bearing assembly; and the male housing including a bearing engaging stop surface for limiting axial movement of the male housing with respect to the bearing assembly;

a bearing securing device for fixing the axial position of the bearing assembly with respect to the female housing.

5. The swivel as defined in claim 1, further comprising:

the first and second static sealing surfaces each being spaced radially outward of the respective first and second seal stop surface, such that fluid may pass from the interior of the male and female housing past the first and second stop surfaces to the respective first and second seal ring members.

6. The swivel as defined in claim 5, further comprising:

each of the first and second seal stop surfaces being a planar surface substantially perpendicular to the central axis;

each of the first and second static sealing surfaces being a cylindrical surface substantially perpendicular to the respective first and second seal stop surfaces.

7. The swivel as defined in claim 1, further comprising:

each of the first and second cavity between the respective stop leg and dynamic leg including an elastomeric ring receiving portion for receiving a majority of each elastomeric ring, and an excess material portion having a restricted access for receiving excess elastomeric ring material.

8. The swivel as defined in claim 7, further comprising:

each of the first and second elastomeric rings having a radially outward sealing surface for sealing engagement with the respective first and second static sealing surface; and the outer sealing surface of each first and second elastomeric ring is radially opposite the respective excess elastomeric ring member material with respect to the majority of each elastomeric ring.

9. The swivel as defined in claim 1, further comprising:

a first and second securing member for rotationally securing the respective first and second plastic rings to the respective first and second seal stop surfaces.

10. The swivel as defined in claim 9, further comprising:

each of the first and second swivel stop surfaces being a substantially planar surface; and each of the first and second securing members is a raised discontinuity in the respective first and second seal stop surface.

11. A swivel for transmitting fluid between an upstream component and a downstream component while permitting rotation of one component relative to the other, the swivel comprising:

a male housing having a first seal stop surface and a first static sealing surface radially outward of the first seal stop surface;

a female housing having a second seal stop surface and a second static sealing surface radially outward of the second seal stop surface;

a first annular seal ring member including a first plastic ring having a generally U-shaped cross-sectional configuration defining a first ring-shaped stop let for static engagement with the first seal stop surface, an axially spaced first ring-shaped dynamic leg, and a radially inward first base interconnecting the first stop leg and first dynamic leg, the first stop leg and the first dynamic leg defining a first cavity therebetween having a first radially outward facing opening;

the first annular seal ring member further including a first elastomeric ring within the first cavity for maintaining a static seal with the first static sealing surface;

a second annular seal ring member including a second plastic ring having a generally U-shaped cross-sectional configuration defining a second ring-shaped stop leg for static engagement with the second seal stop surface, an axially spaced second ring-shaped dynamic leg, and a radially inward second base interconnecting the second stop leg and second dynamic leg, the second stop leg and second dynamic leg defining a second cavity therebetween having a second radially outward facing opening;

the second annular seal ring member further including an elastomeric second ring within the second cavity for maintaining a static seal with the second static sealing surface; and each of the first dynamic leg and second dynamic leg having a sealing surface in dynamic sealing engagement with the sealing surface of the other dynamic leg when the male housing rotates relative to the female housing.

12. The swivel as defined in claim 11, further comprising:

each of the first and second seal stop surfaces being a planar surface substantially perpendicular to the central axis; and each of the first and second static sealing surfaces being a cylindrical surface substantially perpendicular to the respective first and second seal stop surfaces.

13. The swivel as defined in claim 11, further comprising:

a first and a second securing member for rotationally securing the respective first and second plastic rings to the respective first and second seal stop surfaces.

14. The swivel as defined in claim 11, further comprising:

each of the first and second elastomeric rings within the respective first and second cavities use each dynamic leg axially away from each stop leg.

15. The swivel as defined in claim 11, further comprising:

each of the first and second cavity between the receptive stop leg and dynamic leg including an elastomeric ring receiving portion of receiving a majority of each elastomeric ring, and an excess material portion having a restricted access for receiving excess elastomeric ring material.

16. A seal assembly for dynamic sealing between a first and second component while permitting rotation of one component relative to the other component, the first component including a list seal stop surface and first static sealing surface, and the second component including a second seal stop surface and second static sealing surface, the seal assembly comprising:

a first annular seal ring member including a first plastic ring having a generally U-shaped cross-section configuration defining a first ring-shaped stop leg for static engagement with the first seal stop surface, an axially spaced first ring-shaped dynamic leg, and a first base interconnecting the first stop leg and first dynamic leg, the first stop leg and the first dynamic leg defining a first cavity therebetween having a first opening;

the first seal ring member further including a first elastomeric ring within the first cavity for using the first dynamic leg axially away from the first stop leg, and for maintaining a static seal with the first static sealing surface;

a second annular seal ring member including a second plastic ring having a generally U-shaped cross-sectional configuration defining a second ring-shaped stop leg for static engagement with the second seal stop surface, an axially spaced second second ring-shaped dynamic leg, and a second base interconnecting the second stop leg and second dynamic leg, the second stop leg and second dynamic leg defining a second cavity therebetween having a second opening;

the second seal ring member further including a second elastomeric ring within the second cavity for urging the second dynamic leg axially away from the second stop leg, and for maintaining a static seal with the second static sealing surface;

each of the first dynamic leg and second dynamic leg having a sealing surface in dynamic sealing engagements with the sealing surfaced of the other dynamic leg when the first component rotates relative to the second component; and each of the first and second cavity between the respective stop leg and dynamic leg including an elastomeric ring receiving portion for receiving a majority of each elastomeric ring, and an excess material portion having a restricted access for receiving excess elastomeric ring material.

17. The seal assembly as defined in claim 16, further comprising:

the base of each plastic ring generally facing a central axis of the seal ring;

the opening of each of the first and second cavity being radially outward, such that fluid pressure radially interior of the seal ring enhances static sealing engagement between each first and second annular seal ring member and the respective first and second static sealing surface.

18. The seal assembly as defined in claim 16, further comprising:

each of the first and second elastomeric rings having a radially outward sealing surface for sealing engagement with the respective first and second static sealing surface; and the outward sealing surface of each first and second elastomeric ring is radially opposite the respective excess elastomeric ring material with respect to the majority of each elastomeric ring.

19. The seal assembly as defined in claim 16, further comprising:

the sealing surface of each first and second dynamic leg being a planar surface substantially perpendicular of the central axis.

20. A seal assembly for dynamic sealing between a first and second component while permitting rotation of one component relative to the other component, the first component including a first seal stop surface and first static sealing surface, and the second component including a second seal stop surface and second static sealing surface, the seal assembly comprising:

a first annular seal ring member including a first plastic ring having a generally U-shaped cross-sectional configuration defining a first ring-shaped stop leg for static engagement with the first seal stop surface, an axially spaced first ring-shaped dynamic leg, and a first base interconnecting the first stop leg and first dynamic leg, the first stop leg and the first dynamic leg defining a first cavity therebetween having a first opening;

the first seal ring member further including a first elastomeric ring within the first cavity for urging the first dynamic leg axially away from eh first stop leg, and for maintaining a static seal with the first static sealing surface;

a second annular seal ring member including a second plastic ring having a generally U-shaped cross-sectional configuration defining a second ring-shaped stop leg for static engagement with the second steal stop surface, an axially spaced second ring-shaped dynamic leg, and a second base interconnecting the second stop leg and second dynamic leg, the second stop leg and second dynamic leg defining a second cavity therebetween having a second opening;

the second seal ring member further including a second elastomeric ring within the second cavity for urging the second dynamic leg axially away from the second stop leg, and for maintaining a static seal with the second static sealing surface;

each of the first dynamic leg and second dynamic leg having a sealing surface in dynamic sealing engagement with the sealing surface of the other dynamic leg when the first component rotates relative to the second component;

the base of each plastic ring generally facing a central axis of the seal ring; and the opening of each of the first and second cavity being radially outward, such that fluid pressure radially interior of the seal ring enhances static sealing engagement between each first and second annular seal ring member and the respective first and second static sealing surface.

21. The seal assembly as defined in claim 20, further comprising:

the sealing surface of each first and second dynamic leg being a planar surface substantially perpendicular to the central axis.

22. The seal assembly as defined in claim 20, further comprising:

each of the first and second cavity between the respective stop leg and dynamic leg including an elastomeric ring receiving portion for receiving a biasing portion of each elastomeric ring, respectively.

23. The seal assembly as defined in claim 22, further comprising:

each of the first and second elastomeric rings having a radially outward sealing surface for sealing engagement with the respective first and second static sealing surface.

24. The seal assembly as defined in claim 22, further comprising:

each of the first and second elastomeric rings having an excess elastomeric ring material portion within a restricted access portion of a respective first and second cavity; and the outward sealing surface of each first and second elastomeric ring is radially opposite the respective excess elastomeric ring material portion with respect to the biasing portion of each elastomer ring.

* * * * *

UNITED STATES PATENT AND TRADEMARK OFFICE
CERTIFICATE OF CORRECTION

PATENT NO. : 5,316,351
DATED : May 31, 1994
INVENTOR(S) : Arnold Czimny, Spencer M. NImberger, and Robert L. Ward It is certified that error appears in the above-indentified patent and that said Letters Patent is hereby corrected as shown below:

In Column 10, Line 27, delete "as" and insert therefor --a--.

In Column 11, Line 41, after "and" insert --a--.

In Column 12, Line 45, delete "use" and insert therefor --urge--.

In Column 12, Line 58, delete "list" and insert therefor --first--.

In Column 13, Line 25, delete "surfaced" and insert therefor --surface--.

In Column 14, Line 9, delete "eh" and insert therefor --the--.

In Column 14, Line 15, delete "steal" and insert therefor --seal--.

Signed and Sealed this

Thirtieth Day of August, 1994

Attest:

BRUCE LEHMAN

*Attesting Officer*  *Commissioner of Patents and Trademarks*